Patented Dec. 11, 1923.

1,477,177

UNITED STATES PATENT OFFICE.

RUDOLPH A. KUEVER, OF IOWA CITY, IOWA, ASSIGNOR TO PEPSODENT COMPANY, OF CHICAGO, ILLINOIS, A CORPORATION OF ILLINOIS.

DENTIFRICE.

No Drawing.　　Application filed April 5, 1920. Serial No. 371,499.

*To all whom it may concern:*

Be it known that I, RUDOLPH A. KUEVER, a citizen of the United States, and a resident of Iowa City, in the county of Johnson and State of Iowa, have invented certain new and useful Improvements in Dentifrice, of which the following is a specification.

This invention relates to dentifrices and has among its objects to produce a dentifrice having an advantageous abrasive action.

While the abrasive ingredient of a dentifrice is of primary importance; the production of an abrasive ingredient capable of effectively performing its intended function without injury to the teeth and which will not interfere with beneficial reactions produced by other ingredients of the dentifrice in the mouth is a matter of considerable difficulty.

I have discovered that a marked efficiency in abrasive action, without deleterious results of any kind may be obtained by mixing dihydrated calcium sulphate with many of the abrasives now employed in dentifrices.

This material is inert to the chemical reactions which may take place in the mouth, may be incorporated in almost any dentifrice without effect therein except as a diluent. It is an excellent abrasive inasmuch as it comes in the form of minute crystals, which may be comminuted as finely as desired, but nevertheless will retain an efficient abrasive action, is softer than the teeth and therefore incapable of injury thereto. Its use in combination with other known abrasives produces most satisfactory results, while at the same time it does not interfere with the beneficial reactions, or functions of the ingredients of a dentifrice in which it may be included.

As a specific illustration of the use of the substance I select a known proteolytic dentifrice, including a proteolytic enzyme, such as pepsin and an acid in combination with an abrasive. In such a dentifrice I may use a liberal portion of the proposed abrasive.

A preferred formula is as follows: pepsin, 0.81%; acid calcium phosphate ($CaHPO_4$), 1.04%; calcium chloride, 0.44%; tri-calcium phosphate, 36.39%; dihydrated calcium sulphate, 15.60%; glycerin, alcohol, water, 45.72%.

The dihydrated calcium sulphate forms, with tri-calcium phosphate, an exceedingly efficient abrasive mixture, while the various reactions which follow the use of the dentifrice in the mouth are not interfered with by the dihydrated calcium sulphate.

I claim:

1. A dentifrice comprising calcium phosphate, and dihydrated calcium sulphate.

2. A dentifrice comprising tri-calcium phosphate, acid calcium phosphate and dihydrated calcium sulphate.

3. The dentifrice specified in claim 1 and containing a proteolytic enzyme in addition to the ingredients therein stated.

4. The dentifrice specified in claim 2 and containing a proteolytic enzyme in addition to the ingredients therein specified.

In witness whereof, I hereunto subscribe my name this 29th day of March, A. D., 1920.

R. A. KUEVER.